W. J. ST. CLAIR.
Harrow.
No. 197,425.  Patented Nov. 20, 1877.
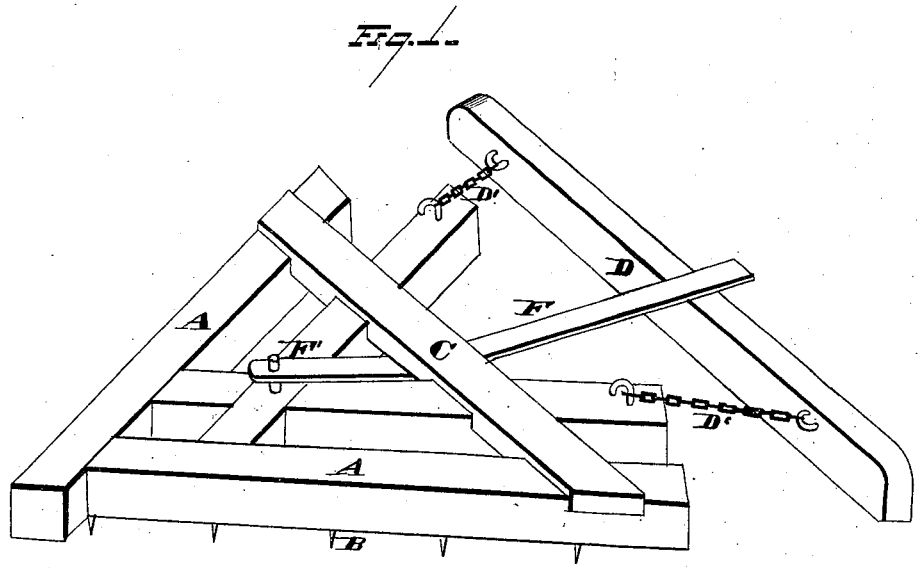
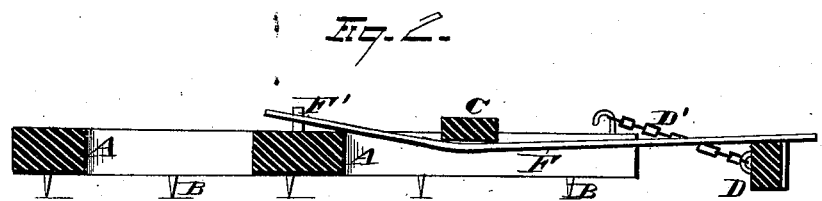
WITNESSES
Ed. L. Nottingham
A. W. Bright.
INVENTOR
Wm J. St Clair.
By Leggett & Leggett
ATTORNEYS

UNITED STATES PATENT OFFICE.

WILLIAM J. ST. CLAIR, OF FREELAND, OHIO.

IMPROVEMENT IN HARROWS.

Specification forming part of Letters Patent No. 197,425, dated November 20, 1877; application filed August 21, 1877.

*To all whom it may concern:*

Be it known that I, WILLIAM J. ST. CLAIR, of Freeland, in the county of Muskingum and State of Ohio, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and consists in the combination, with the harrow and drag-bar, of a lever for bearing down upon the drag-bar and causing the said bar to break up the clods, &c., substantially as hereinafter specified and claimed.

In the drawing, Figure 1 is a perspective view of a harrow embodying the principle of my invention. Fig. 2 is a longitudinal central section containing the bearing-down lever.

A are the arms, which constitute the frame of the harrow. B are the teeth, of ordinary construction and arrangement. The frame may be of any desired nature—triangular, square, or of any desired form. C is a cross-bar. D is a drag-bar, in the rear of the harrow, attached thereto by suitable chains or similar connections D'. This drag-bar serves to crush the lumps and to level the ground.

In order to press down the bar D more firmly against the ground and cause it to ride steadily, I employ a bar, F. This bar is fastened at F' on the upper surface of the harrow. It passes back beneath the cross-bar C and over the top of the drag-bar D. It will thus be seen that its rear end exerts a downward pressure upon the drag-bar D, and causes it alike to ride steadily and to press firmly against the ground. The bar F may either be a rigid bar, or it may be in the form of a spring-bar, so as to yield by its elasticity to any considerable obstruction.

Of course it is not essential that the bar F should be secured just as shown, for it may be made stationary with the harrow, or its forward end may extend into a mortise, and be there secured, instead of being secured by slipping over the point at F'.

What I claim is—

The combination, with the harrow and drag-bar D, of the flexible side connections D' and the horizontal lever-bar F, the latter being secured to the central part of the harrow, bent rearward beneath the cross-bar C, and adapted, as described, to have sliding bearings, and exert a strong downward pressure upon the said drag-bar, substantially as described.

In testimony whereof I have signed my name to this specification in the presence of two subscribing witnesses.

WILLIAM J. ST. CLAIR.

Witnesses:
   CHRISTIAN PLANTZ, Jr.,
   CHRISTIAN PLANTZ, Sr.